(12) United States Patent
Fortunato

(10) Patent No.: US 11,895,377 B1
(45) Date of Patent: Feb. 6, 2024

(54) SYSTEMS AND METHODS FOR PRESENTING VIDEOS

(71) Applicant: GoPro, Inc., San Mateo, CA (US)

(72) Inventor: Steven Fortunato, Solana Beach, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 17/947,631

(22) Filed: Sep. 19, 2022

(51) Int. Cl.
| | |
|---|---|
| H04N 21/8545 | (2011.01) |
| H04N 21/8549 | (2011.01) |
| G06K 9/20 | (2006.01) |
| G06K 9/48 | (2006.01) |
| G06K 9/62 | (2022.01) |
| G06V 10/94 | (2022.01) |
| G06V 20/40 | (2022.01) |

(52) U.S. Cl.
CPC ....... *H04N 21/8545* (2013.01); *G06V 10/945* (2022.01); *G06V 20/41* (2022.01); *H04N 21/8549* (2013.01)

(58) Field of Classification Search
CPC .............. G06F 16/739; H04N 21/8545; H04N 21/8549; H04N 21/858; G06V 20/41; G06V 10/945
See application file for complete search history.

(56) References Cited

U.S. PATENT DOCUMENTS

| | | | | |
|---|---|---|---|---|
| 9,787,862 | B1* | 10/2017 | Newman | G11B 27/031 |
| 9,953,224 | B1* | 4/2018 | Wills | G11B 27/031 |
| 10,043,552 | B1* | 8/2018 | Martin | H04N 23/698 |
| 10,395,122 | B1* | 8/2019 | Sievert | G06V 20/49 |
| 10,402,698 | B1* | 9/2019 | Tse | G06V 20/41 |
| 10,509,966 | B1* | 12/2019 | Noel | G06V 20/46 |
| 2015/0067744 | A1* | 3/2015 | Furtwangler | H04N 21/2387 725/88 |
| 2015/0375117 | A1* | 12/2015 | Thompson | A63F 13/79 463/9 |
| 2020/0050884 | A1* | 2/2020 | Han | G06V 20/10 |

* cited by examiner

*Primary Examiner* — Cesar B Paula
*Assistant Examiner* — Carl E Barnes, Jr.
(74) *Attorney, Agent, or Firm* — ESPLIN & ASSOCIATES, PC

(57) ABSTRACT

A video may be presented with a timeline representation of the video. The timeline representation may enable a user to jump to different parts of the video. An action curve for the video may be presented along the timeline representation. The action curve may include values that represent different actions taken/experienced by an image capture device while capturing the video. The action curve may help the user identify/locate different parts of the video.

20 Claims, 5 Drawing Sheets

SYSTEMS AND METHODS FOR PRESENTING VIDEOS

FIELD

This disclosure relates to a user interface that presents a video with an action curve.

BACKGROUND

A user interface may present a video with a timeline representation of the video. The user may interact with the timeline representation to see different parts of the video. Lack of other information about the video may make it hard for a user to locate specific parts of the video.

SUMMARY

This disclosure relates to presenting videos. Video information, action curve information, and/or other information may be obtained. The video information may define a video captured by an image capture device. The video may have a progress length. The action curve information may define an action curve for the video. The action curve may have action values as a function of progress through the progress length of the video based on action of the image capture device during capture of the video. A graphical user interface may be presented on a display. The graphical user interface may include presentation of the video. The graphical user interface may include interface elements that convey information relating to the video. The interface elements may include a timeline element, an action curve element, and/or other interface elements. The timeline element may represent the progress length of the video. The action curve element may represent the action curve for the video. The action curve element may be adjacent to the timeline element within the graphical user interface.

A system for presenting videos may include one or more electronic storage, processor, and/or other components. The electronic storage may store video information, information relating to a video, action curve information, information relating to an action curve for a video, information relating to an image capture device, information relating to a graphical user interface, and/or other information.

The processor(s) may be configured by machine-readable instructions. Executing the machine-readable instructions may cause the processor(s) to facilitate presenting videos. The machine-readable instructions may include one or more computer program components. The computer program components may include one or more of a video component, an action curve component, a graphical user interface component, and/or other computer program components. In some implementations, the computer program components may further include a classification component.

The video component may be configured to obtain video information and/or other information. The video information may define one or more videos. A video may be captured by an image capture device. A video may have a progress length.

The action curve component may be configured to obtain action curve information and/or other information. The action curve information may define an action curve for a video. The action curve may have action values as a function of progress through the progress length of the video. The action values may be determined based on action of the image capture device during capture of the video and/or other information. In some implementations, the action of the image capture device may include interpretation of movement of the image capture device.

The classification component may be configured to obtain classification information and/or other information. The classification information may define classification of a thing depicted within the video at a moment within the progress length of the video.

The graphical user interface component may be configured to present one or more graphical user interfaces on one or more displays. A graphical user interface may include presentation of the video(s). A graphical user interface may include interface elements that convey information relating to the video(s). The interface elements may include a timeline element, an action curve element, and/or other interface elements. A timeline element may represent a progress length of a video, and an action curve element may represent an action curve for the video. The action curve element may be adjacent to the timeline element within a graphical user interface. In some implementations, the timeline element and the action curve element may be overlaid on top of the presentation of the video. In some implementations, the timeline element may be adjacent to the presentation of the video and the action curve element may be overlaid on top of the presentation of the video.

In some implementations, the interface elements may further include a classification element. A classification element may identify classification of a thing depicted within a video at a moment within the progress length of the video. In some implementations, a classification element may be presented along an action curve element. The location of the classification element along the action curve element may corresponding to the moment within the progress length of the video. In some implementations, a classification element may be presented along the action curve element based on one or more of the action values at the moment within the progress length of the video satisfying an action value threshold and/or other information.

In some implementations, a graphical user interface may include presentations of multiple videos. The timeline element, the action curve element, and/or other interface elements for a video may be presented based on user selection of the video. In some implementations, the presentation of the video within the graphical user interface may be enlarged based on the user selection of the video and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
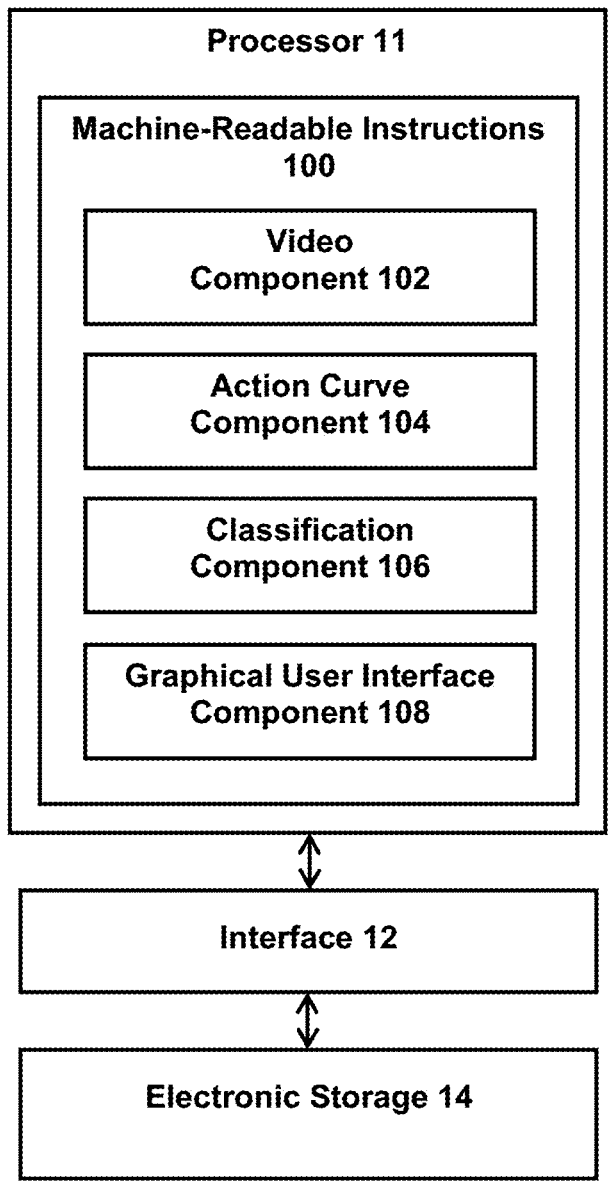
FIG. 1 illustrates a system for presenting videos.

FIG. 1 illustrates a system 10 for presenting videos. The system 10 may include one or more of a processor 11, an interface 12 (e.g., bus, wireless interface), an electronic storage 13, and/or other components. Video information, action curve information, and/or other information may be obtained by the processor 11. The video information may define a video captured by an image capture device. The video may have a progress length. The action curve information may define an action curve for the video. The action curve may have action values as a function of progress through the progress length of the video based on action of the image capture device during capture of the video. A graphical user interface may be presented on a display by the processor 11. The graphical user interface may include presentation of the video. The graphical user interface may include interface elements that convey information relating to the video. The interface elements may include a timeline element, an action curve element, and/or other interface elements. The timeline element may represent the progress length of the video. The action curve element may represent the action curve for the video. The action curve element may be adjacent to the timeline element within the graphical user interface.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, action curve information, information relating to an action curve for a video, information relating to an image capture device, information relating to a graphical user interface, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting videos. The machine-readable instructions 100 may include one or more computer program components. The machine-readable instructions 100 may include one or more of a video component 102, an action curve component 104, a graphical user interface component 108, and/or other computer program components. In some implementations, the computer program components may further include a classification component 106.

The video component 102 may be configured to obtain video information and/or other information. Obtaining video information may include one or more of accessing, acquiring, analyzing, capturing, determining, examining, generating, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor, a processor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define one or more videos. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

A video may be captured by an image capture device. A video may be captured by an image capture device during a capture duration. A capture duration may be measured/defined in terms of time durations and/or frame numbers. For example, a video may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Content of a video may be referred to as video content. Video content may include visual content, audio content, and/or other content. For example, video content may include visual content viewable as a function of progress through the video progress length of the video content, audio content playable as a function of progress through the video progress length of the video content, and/or other content that may be played back as a function of progress through the video progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the video progress length of the video content. A video frame may include an image of the video content at a moment within the video progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content may be stored in one or more formats and/or one or more containers. Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The video information may define a video by describing, characterizing, and/or otherwise defining the video. The video information may define a video by including information that defines one or more content, qualities, attributes, features, and/or other aspects of the video. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The action curve component 104 may be configured to obtain action curve information and/or other information. Obtaining action curve information may include one or more of accessing, acquiring, analyzing, capturing, determining, examining, generating, identifying, loading, locating, opening, receiving, retrieving, reviewing, selecting, storing, and/or otherwise obtaining the action curve information. The action curve component 104 may obtain action curve information from one or more locations. For example, the action curve component 104 may obtain action curve information from a storage location, such as the electronic storage 13, electronic storage of a device accessible via a network, and/or other locations. The action curve component 104 may obtain action curve information from one or more hardware components (e.g., a processor) and/or one or more software components (e.g., software running on a computing device).

The action curve information may define an action curve for a video. An action curve for a video may refer to a graphical representation of the action of the image capture device during capture of the video. An action curve may refer to a line that plots action values of the video as a function of progress through the progress length of the video. The action curve may have action values as a function of progress through the progress length of the video. An action value may refer to a numerical quantity that represent action of the image capture device. An action value may refer to a numerical quantity that is tied to the action of the image capture device. The action values may be determined based on the action of the image capture device during capture of the video and/or other information.

Action of an image capture device may refer to a manner in which the image capture device is moved, engaged, and/or otherwise acted by a user and/or the environment of the image capture device. Action of an image capture device may include intentional movement and/or unintentional movement of the image capture device. In some implementations, the action of the image capture device may include interpretation of movement of the image capture device. For example, different aspects of image capture device movement (e.g., translational speed, rotational speed, top/bottom speed, translational acceleration, rotational acceleration, top/bottom acceleration, direction of movement, direction of gravity on the image capture device, periodic movement, stability, panning movement, movement in the air) may be analyzed to convert the action at a particular moment in the video to a particular action value.

In some implementations, the action values may be determined further based on non-movement aspects of the video. For example, the action values may be determined further based on analysis of the visual content, the audio content, and/or other content of the video. For instance, the action values may be determined further based on identification of particular depictions (e.g., depictions of particular persons, faces, smiles, objects, and/or scenery) within the visual content and/or particular sounds (e.g., voice, shouting, screaming) within the audio content. Other determinations of action values are contemplated.

The action curve information may define an action curve for a video by describing, characterizing, and/or otherwise defining the action curve. The action curve information may define an action curve by including information that defines one or more content, qualities, attributes, features, and/or other aspects of the action curve. For example, the action curve information may define an action curve by including information that specifies action values at different moment in the video and/or information that is used to determine the action values at different moments in the video. Other types of action curve information are contemplated.

The classification component 106 may be configured to obtain classification information and/or other information. Obtaining classification information may include one or more of accessing, acquiring, analyzing, capturing, determining, examining, generating, identifying, loading, locating, opening, receiving, retrieving, reviewing, selecting, storing, and/or otherwise obtaining the classification information. The classification component 106 may obtain classification information from one or more locations. For example, the classification component 106 may obtain classification information from a storage location, such as the electronic storage 13, electronic storage of a device accessible via a network, and/or other locations. The classification component 106 may obtain classification information from one or more hardware components (e.g., a processor) and/or one or more software components (e.g., software running on a computing device). The classification component 106 may obtain classification information by determining/generating the classification information (e.g., based on analysis of the video, metadata for the video) and/or retrieving previously determined/generated classification information.

The classification information may define classification of one or more things depicted within a video at one or more moments within the progress length of the video. A moment within the progress length of the video may refer to a point in time or a duration of time within the progress length of the video. A thing depicted within the video may refer to a living thing, a non-living thing, a scenery, a movement of a thing, a movement of the image capture device, and/or other things captured within the video. For example, a thing depicted within the video may refer to a particular object (e.g., person, face, smile, emotion) depicted within the video, a type of view (e.g., landscape view, panoramic view, aerial view, selfie view, differentiation between types of scenes, such as between vegetation scene, indoor scene, underwater scene, urban scene, snowy scene) depicted within the video, and/or a type of motion (e.g., jumping motion, falling motion, flying motion) depicted within the video. Classification of a thing may refer to category, labeling, grouping, identity, description, and/or other classification of the thing.

In some implementations, classification of a thing depicted within a video may be independent of (separate from) the action of the image capture device that captured the video. Classification of a thing depicted at a moment within a video may be independent of the action (e.g., movement) of the image capture device when the moment within the video was captured by the image capture device. For example, classification of a thing depicted at a moment within a video may include identity of an object, a scene, or a type of view depicted within the video.

In some implementations, classification of a thing depicted within a video may be dependent on (derived from) the action of the image capture device that captured the video. Classification of a thing depicted at a moment within a video may be dependent on the action (e.g., movement) of the image capture device when the moment within the video was captured by the image capture device. For example, classification of a thing depicted at a moment within a video may include identity of the type of action (e.g., panning, jumping, flying, stable shot, shaky shot) taken by the image capture device when the moment was captured by the image capture device.

The classification information may define classification of a thing depicted within a video at a moment within the progress length of the video by describing, characterizing, and/or otherwise defining the classification information may define classification of a thing by including information that defines one or more content, qualities, attributes, features, and/or other aspects of the classification of the thing. For example, the classification information may define classification of a thing by including information that identifies/species the classification of the thing at a particular moment in the video and/or information that is used to determine the classification of the thing at the particular moment in the video. Other types of classification information are contemplated.

The graphical user interface component 108 may be configured to present one or more graphical user interfaces. The graphical user interface(s) may be presented on one or more displays. A display may refer to an electronic device that provides visual presentation of information. A display may be configured to present visual content, graphical user interface(s), and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface(s) may be received through the display (e.g., touchscreen display) and/or other user interface devices (e.g., keyboard, mouse, trackpad).

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element of a graphical user interface may refer to a graphical element of the graphical user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include presentation of one or more videos. For example, a graphical interface may include presentation of a single video at a time, or may include presentation of multiple videos at once. Presentation of a video may include a static presentation of the video (e.g., presentation of a thumbnail image representing the video) and/or a dynamic presentation of the video (e.g., playback of the video).

A graphical user interface may include interface elements that convey information relating to the video(s). Information relating to a video may refer to information relating to content of the video, information relating to an action curve for the video, information relating to classification of things depicted within the video, and/or other information relating to the video. The interface element may convey other types of information.

The interface elements may include a timeline element, an action curve element, and/or other interface elements. A timeline element may refer to an interface element that visually represents the progress length (e.g., duration) of a video. A timeline element for a video may represent the progress length of the video. Separate timeline elements may be presented for separate videos. An action curve element may refer to an interface element that visually represents an action curve for a video. An action curve element for a video may represent an action curve for the video. Separate action curve elements may be presented for separate videos.

Within a graphical user interface, an action curve element for a video may be adjacent to a timeline element for the video. The action curve element may run parallel to the timeline element and visually indicate action values for different moments within the video. Including an action curve for the video with the timeline element for the video may enable a user to locate specific parts of the video (e.g., a part with high/low action value, a part with sustained high/low action value).

In some implementations, the timeline element and the action curve element may be overlaid on top of the presentation of the video. In some implementations, the timeline element may be adjacent to the presentation of the video (not overlaid on top of the presentation of the video) and the action curve element may be overlaid on top of the presentation of the video.

Figure 3:
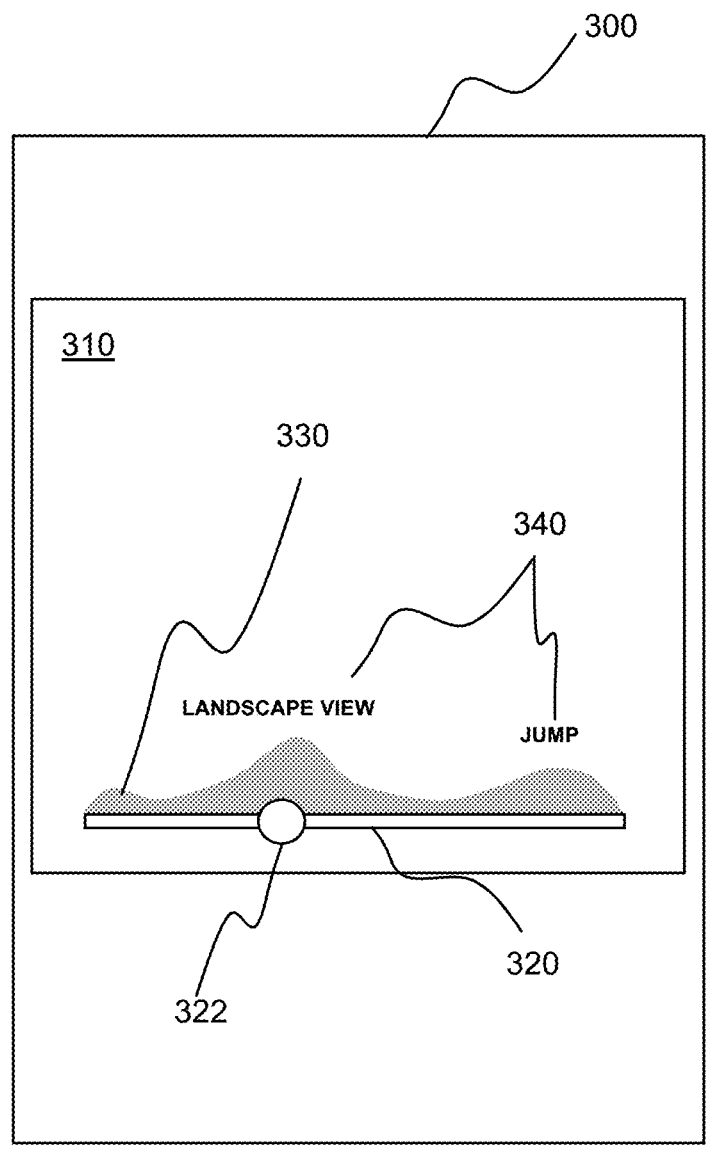
FIG. 3 illustrates an example graphical user interface.
Figure 4A:
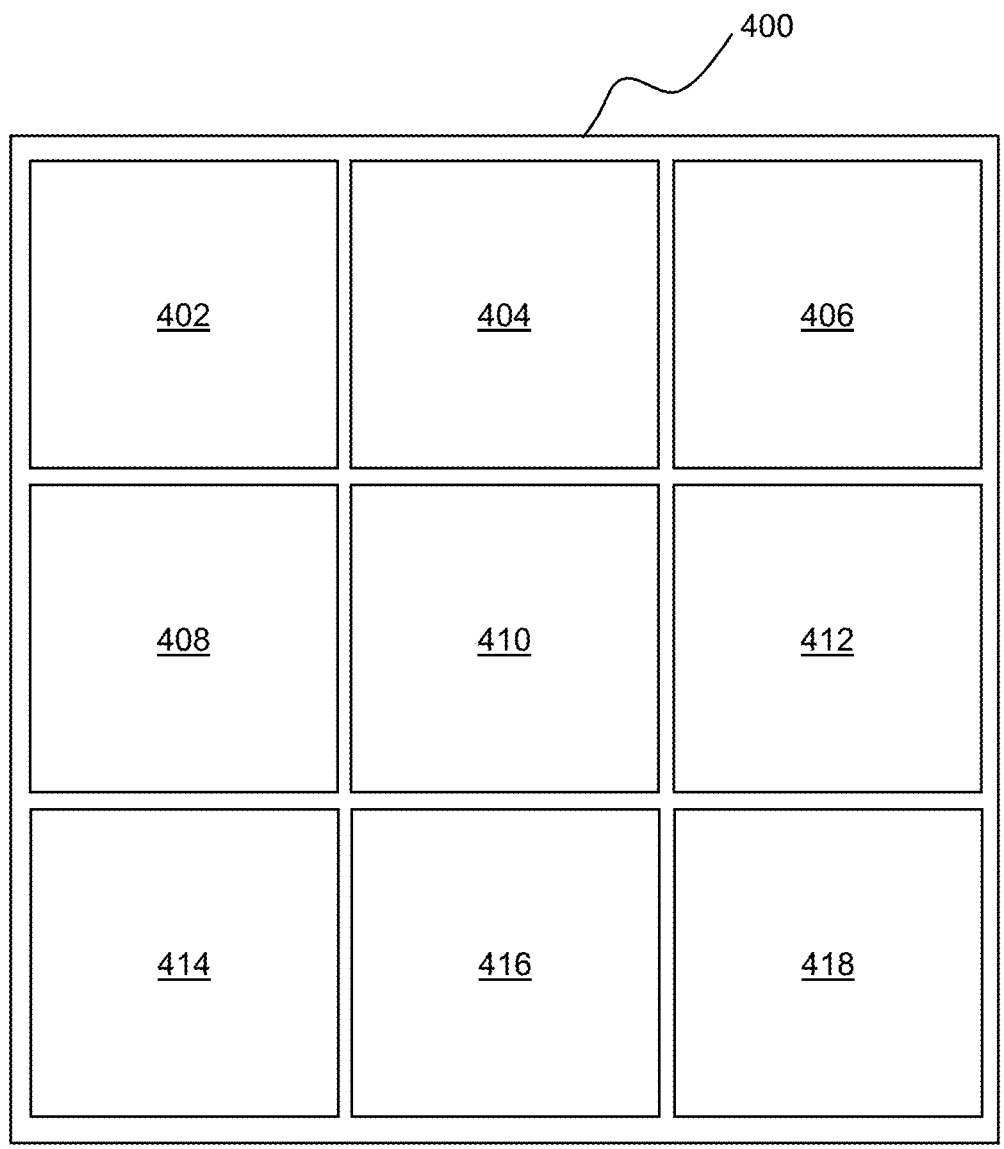
FIG. 4A illustrates an example graphical user interface.
Figure 4B:
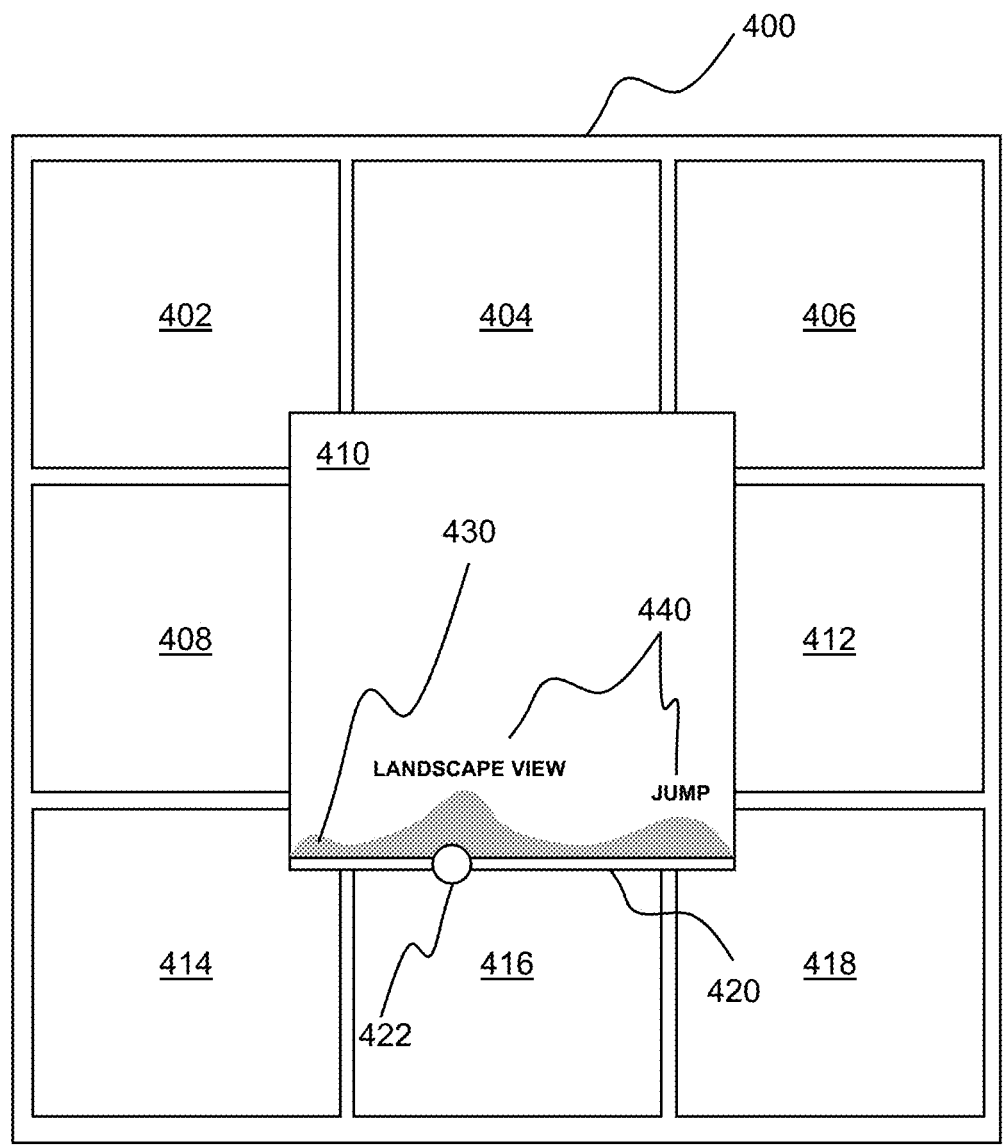
FIG. 4B illustrates an example graphical user interface.

FIGS. 3, 4A, and 4B illustrate example views of graphical user interfaces 300, 400. The views of the graphical user interfaces 300, 400 in FIGS. 3, 4A, and 4B are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3, 4A, and/or 4B. Other graphical user interfaces are contemplated.

Referring to FIG. 3, the graphical user interface 300 may include presentation 310 of a video. The presentation 310 may include a particular image/video frame from the video and/or playback of multiple images/video frames from the video. The graphical user interface 300 may include a timeline element 320. The timeline element 320 may represent the progress length of the video being presented. The graphical user interface may include a current moment element 322. The current moment element 322 may be positioned along the timeline element 320 to visually indicate the moment of the video that is being presented within the graphical user interface 300. The graphical user interface 300 may include an action curve element 330. The action curve element 330 may represent the action curve for the video being presented. The action curve element 330 may be adjacent to (positioned above) the timeline element 320. The action curve element 330 may be positioned in other adjacent positions (e.g., below or parallel with the timeline element 320). Other types and/or shapes of timeline element, current moment element, and action curve element are contemplated.

In FIG. 3, the timeline element 320 and the action curve element 330 for the video being presented may be overlaid on top of the presentation 310 of the video. The timeline element 320 and the action curve element 330 may appear on top of the presentation 310 of the video to hide one or more spatial parts of the video. The timeline element 320 and/or the action curve element 330 may be opaque, transparent, or semi-transparent.

In some implementations, a graphical user interface may include presentations of multiple videos. The timeline element, the action curve element, and/or other interface elements for a particular video may be presented based on user selection of the video. In some implementations, the presentation of the video within the graphical user interface may be enlarged based on the user selection of the video and/or other information.

Referring to FIG. 4A, the graphical user interface 400 may include presentations 402, 404, 406, 408, 410, 412, 414, 416, 418 of nine different videos. Simultaneous presentations of other numbers of video is contemplated. The presentations 402, 404, 406, 408, 410, 412, 414, 416, 418 include a particular image/video frame from the corresponding video. For example, the graphical user interface 400 may provide a view of a media library including the presented videos. A user may interface with one of the presentations 402, 404, 406, 408, 410, 412, 414, 416, 418 to see playback of the selected video.

For example, responsive to user selection of the presentation 410 (e.g., clicking on the presentation 410, holding a finger on the presentation 410 for a duration of time, hovering a mouse cursor over the presentation 410 for a duration of time), the graphical user interface 400 may change to the view shown in FIG. 4B. In FIG. 4B, the presentation 410 may have become enlarged (grow in size) compared to other presentations 402, 404, 406, 408, 412, 414, 416, 418. A timeline element 422 for the selected video may be presented below the presentation 410. The timeline element 422 may not cover any spatial parts of the selected video. A current moment element 422 may be positioned along the timeline element 420 to visually indicate the moment of the selected video that is being presented within the presentation 410. An action curve element 430 for the selected video may be presented adjacent to the timeline element 422. The action curve element 430 may be overlaid on top of the presentation 410 of the video. The action curve element 430 may be opaque, transparent, or semi-transparent. Such presentation of the videos may provide a summary view of multiple videos. Such presentation of the videos may enable a user to use the action curve elements to identify and view specific parts of the videos without going into a single video player mode, such as shown in FIG. 3.

In some implementations, the interface elements may further include one or more classification elements. A classification element may refer to an interface element that visually identifies classification of thing(s) depicted within a video. A classification element may identify classification of a particular thing depicted within a video at a particular moment within the progress length of the video. A classification element may be presented along an action curve element. The location of the classification element along the action curve element may correspond to the particular moment within the progress length of the video at which the particular thing is depicted. Presentation of both the action curve element and the classification element may increase the user's ability to identify and view specific parts of the videos. Presentation of both the action curve element and the classification element may enable the user to identify the video (e.g., recognize the content of the video) without watching the video.

For example, in FIG. 3, the graphical user interface 300 may include classification elements 340. The classification elements 340 may identify classification of things depicted at different moments within the video (e.g., the video including a landscape view towards the middle of the video and a jump towards the end of the video). Similarly, in FIG. 4, the graphical user interface 400 may include classification elements 440. The classification elements 440 may identify classification of things depicted at different moments within the video. Other types and/or shapes of classification element are contemplated.

In some implementations, the classification element(s) may be presented along the action curve element based on the action value(s) at the corresponding moment(s) within the progress length of the video satisfying one or more action value thresholds (e.g., being larger than an action value threshold, being equal to or larger than an action value threshold) and/or other information. Including a classification element for every classification in the video may result in the graphical user interface becoming too cluttered/busy. Rather than presenting every classification made in the video, only those classification corresponding to moments with particular action values (e.g., high action values) may be presented. Placing such limits on the presentation of classification elements may reduce the number of classification elements presented within int eh graphical user interface. Placing such limits on the presentation of classification elements may result in the graphical user interface providing classification of video only at those moments where the action values indicate that the moments are of interest to users.

In some implementations, different values of action value thresholds may be used for different types of classification. For example, different action value thresholds may be used for classification based on an object/scene depicted within the video versus classification based on motion depicted within the video. Use of different action values thresholds for different types of classification may enable finer control on when/what type of classifications are presented within the graphical user interface.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the disclosure has been described above using different figures, one or more features/functionalities described with respect to one figure is not limited to the one figure and may be applied to other aspects of the disclosure. For example, one or more features/functionalities described with respect to FIG. 1 may be applied may be applied to other aspects of the disclosure (e.g., as described with respect with other figures).

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
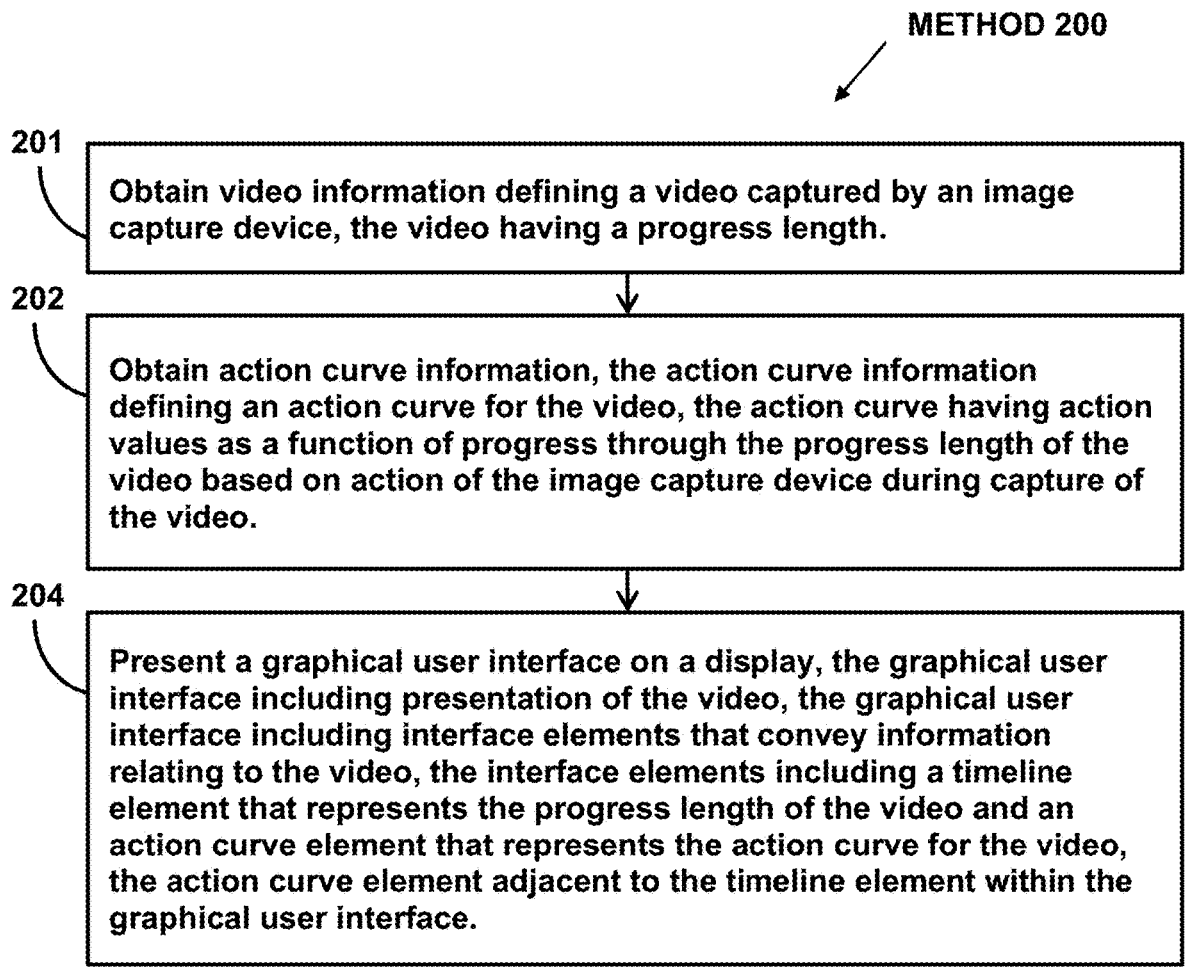
FIG. 2 illustrates a method for presenting videos.

FIG. 2 illustrates method 200 for presenting videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video captured by an image capture device. The video may have a progress length. In some implementations, operation 201 may be performed by a processor component the same as or similar to the video component 102 (Shown in FIG. 1 and described herein).

At operation 202, action curve information may be obtained. The action curve information may define an action curve for the video. The action curve may have action values as a function of progress through the progress length of the video based on action of the image capture device during capture of the video. In some implementations, operation 202 may be performed by a processor component the same as or similar to the action curve component 104 (Shown in FIG. 1 and described herein).

At operation 203, a graphical user interface may be presented on a display. The graphical user interface may include presentation of the video. The graphical user interface may include interface elements that convey information relating to the video. The interface elements may include a timeline element, an action curve element, and/or other interface elements. The timeline element may represent the progress length of the video. The action curve element may represent the action curve for the video. The action curve element may be adjacent to the timeline element within the graphical user interface. In some implementations, operation 203 may be performed by a processor component the same as or similar to the graphical user interface component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting videos, the system comprising:
one or more physical processors configured by machine-readable instructions to:
  obtain video information defining a video captured by an image capture device, the video having a progress length;
  obtain action curve information, the action curve information defining an action curve for the video, the action curve having action values as a function of progress through the progress length of the video based on action of the image capture device during capture of the video, the action curve having a first action value at a first moment within the progress length of the video and a second action value at a second moment within the progress length of the video;
  obtain classification information, the classification information defining classification of multiple things depicted within the video at multiple moments within the progress length of the video, the classification of the multiple things including classification of a first thing depicted within the video at the first moment within the progress length of the video and classification of a second thing depicted within the video at the second moment within the progress length of the video; and
  present a graphical user interface on a display, the graphical user interface including presentation of the video, the graphical user interface including interface elements that convey information relating to the video, the interface elements including a timeline element that represents the progress length of the video and an action curve element that represents the action curve for the video, the action curve element adjacent to the timeline element within the graphical user interface, the action curve element overlaid on top of the presentation of the video, the interface elements further including one or more classification elements that identify one or more of the classification of the multiple things depicted within the video, wherein the one or more classification elements are presented based on one or more corresponding action values of the action curve satisfying an action value threshold, wherein a first classification element that identifies the classification of the first thing depicted within the video at the first moment is presented based on the first action value of the action curve at the first moment satisfying the action value threshold and a second classification element that identifies the classification of the second thing depicted within the video at the second moment is not presented based on the second action value of the action curve at the second moment not satisfying the action value threshold.

2. The system of claim 1, wherein:
the action of the image capture device includes interpretation of movement of the image capture device; and
the action value threshold includes different values for different types of classification of the multiple things depicted within the video.

3. A system for presenting videos, the system comprising:
one or more physical processors configured by machine-readable instructions to:
  obtain video information defining a video captured by an image capture device, the video having a progress length;
  obtain action curve information, the action curve information defining an action curve for the video, the action curve having action values as a function of progress through the progress length of the video based on action of the image capture device during capture of the video, the action curve having a first action value at a first moment within the progress length of the video and a second action value at a second moment within the progress length of the video;
  obtain classification information, the classification information defining classification of multiple things depicted within the video at multiple moments within the progress length of the video, the classification of the multiple things including classification of a first thing depicted within the video at the first moment within the progress length of the video and classification of a second thing depicted within the video at the second moment within the progress length of the video; and
  present a graphical user interface on a display, the graphical user interface including presentation of the video, the graphical user interface including interface elements that convey information relating to the video, the interface elements including a timeline element that represents the progress length of the video and an action curve element that represents the action curve for the video, the action curve element adjacent to the timeline element within the graphical user interface, the interface elements further including one or more classification elements that identify one or more of the classification of the multiple things depicted within the video, wherein the one or more classification elements are presented based on one or more corresponding action values of the action curve satisfying an action value threshold, wherein a first classification element that identifies the classification of the first thing depicted within the video at the first moment is presented based on the first action value of the action curve at the first moment satisfying the action value threshold and a second classification element that identifies the classification of the second thing depicted within the video at the second moment is not presented based on the second action value of the action curve at the second moment not satisfying the action value threshold.

4. The system of claim 3, wherein the timeline element and the action curve element are overlaid on top of the presentation of the video.

5. The system of claim 3, wherein the timeline element is adjacent to the presentation of the video and the action curve element is overlaid on top of the presentation of the video.

6. The system of claim 3, wherein the action of the image capture device includes interpretation of movement of the image capture device.

7. The system of claim 3, wherein the action value threshold includes different values for different types of classification of the multiple things depicted within the video.

8. The system of claim 3, wherein the one or more classification elements are presented along the action curve element, a given location of a given classification element along the action curve element corresponding to a given moment within the progress length of the video at which a given thing is depicted within the video.

9. The system of claim 3, wherein a given action value satisfies the action value threshold based on the given action value being larger than the action value threshold.

10. The system of claim 3, wherein the graphical user interface includes presentations of other videos, and the timeline element, the action curve element, and the one or more classification elements for the video are presented based on user selection of the video, further where the timeline element, the action curve element, and the one or more classification elements are not presented for unselected videos.

11. The system of claim 10, wherein the presentation of the video within the graphical user interface is enlarged based on the user selection of the video, wherein the presentation of the video within the graphical user interface grows in size compared to the presentations of the other videos within the graphical user interface.

12. A method for presenting videos, the method performed by a computing system including one or more processors, the method comprising:
  obtaining, by the computing system, video information defining a video captured by an image capture device, the video having a progress length;
  obtaining, by the computing system, action curve information, the action curve information defining an action curve for the video, the action curve having action values as a function of progress through the progress length of the video based on action of the image capture device during capture of the video, the action curve having a first action value at a first moment within the progress length of the video and a second action value at a second moment within the progress length of the video;
  obtaining, by the computing system, classification information, the classification information defining classification of multiple things depicted within the video at multiple moments within the progress length of the video, the classification of the multiple things including classification of a first thing depicted within the video at the first moment within the progress length of the video and classification of a second thing depicted within the video at the second moment within the progress length of the video; and presenting, by the computing system, a graphical user interface on a display, the graphical user interface including presentation of the video, the graphical user interface including interface elements that convey information relating to the video, the interface elements including a timeline element that represents the progress length of the video and an action curve element that represents the action curve for the video, the action curve element adjacent to the timeline element within the graphical user interface, the interface elements further including one or more classification elements that identify one or more of the classification of the multiple things depicted within the video, wherein the one or more classification elements are presented based on one or more corresponding action values of the action curve satisfying an action value threshold, wherein a first classification element that identifies the classification of the first thing depicted within the video at the first moment is presented based on the first action value of the action curve at the first moment satisfying the action value threshold and a second classification element that identifies the classification of the second thing depicted within the video at the second moment is not presented based on the second action value of the action curve at the second moment not satisfying the action value threshold.

13. The method of claim 12, wherein the timeline element and the action curve element are overlaid on top of the presentation of the video.

14. The method of claim 12, wherein the timeline element is adjacent to the presentation of the video and the action curve element is overlaid on top of the presentation of the video.

15. The method of claim 12, wherein the action of the image capture device includes interpretation of movement of the image capture device.

16. The method of claim 12, wherein the action value threshold includes different values for different types of classification of the multiple things depicted within the video.

17. The method of claim 12, wherein the one or more classification elements are presented along the action curve element, a given location of a given classification element along the action curve element corresponding to a given moment within the progress length of the video at which a given thing is depicted within the video.

18. The method of claim 12, wherein a given action value satisfies the action value threshold based on the given action value being larger than the action value threshold.

19. The method of claim 12, wherein the graphical user interface includes presentations of other videos, and the timeline element, the action curve element, and the one or more classification elements for the video are presented based on user selection of the video, further where the timeline element, the action curve element, and the one or more classification elements are not presented for unselected videos.

20. The method of claim 19, wherein the presentation of the video within the graphical user interface is enlarged based on the user selection of the video, wherein the presentation of the video within the graphical user interface grows in size compared to the presentations of the other videos within the graphical user interface.

* * * * *